April 22, 1969  L. F. HOWARD ET AL  3,440,495

HERMETICALLY SEALED ELECTROLYTIC CAPACITOR

Filed Nov. 7, 1966

INVENTORS
LOWELL F. HOWARD
CHARLES G. STURGILL
BY
*Robert Levine*
ATTORNEY

United States Patent Office 3,440,495
Patented Apr. 22, 1969

3,440,495
HERMETICALLY SEALED ELECTROLYTIC CAPACITOR
Lowell F. Howard and Charles G. Sturgill, Indianapolis, Ind., assignors to P. R. Mallory & Co., Inc., Indianapolis, Ind., a corporation of Delaware
Filed Nov. 7, 1966, Ser. No. 592,486
Int. Cl. H01g 9/05, 9/06
U.S. Cl. 317—230                                        9 Claims

ABSTRACT OF THE DISCLOSURE

An electrolytic capacitor having an anode plate disposed at the open end of a container so as to partially close the container and an anode terminal plate attached to the outer surface of the anode plate closing the open end of the container and extending beyond the outer edge of the anode plate.

---

Figure 1:
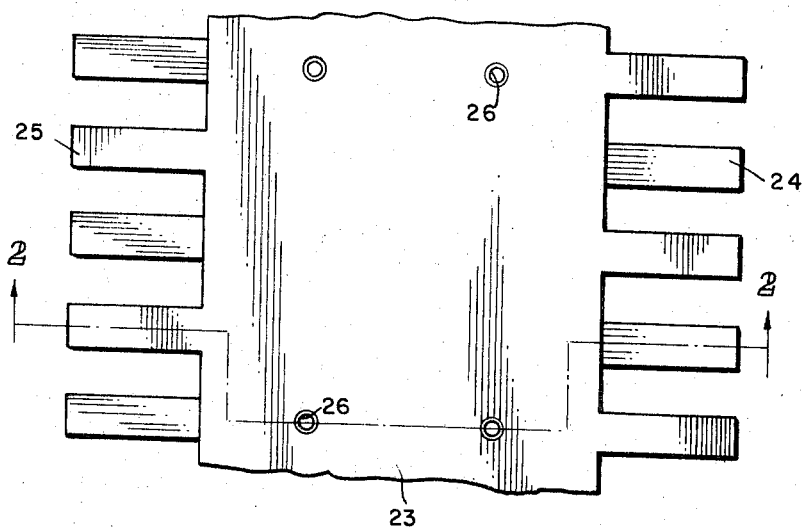

This invention relates to electrolytic capacitors, and more particularly to a novel construction for solid electrolyte tantalum capacitors.

Solid tantalum electrolyte capacitors are being employed instead of commonly used aluminum capacitors for many applications for several reasons. One is the size advantage. Tantalum units having a given capacitance rating can be manufactured so as to be smaller than aluminum electrolytic capacitors having the same rating. Another reason for the increased use of solid tantalum electrolyte capacitors relates to their advantages low temperature characteristics.

Solid electrolyte tantalum capacitors employ a semiconducting oxide in place of a liquid electrolyte that is normally employed in electrolytic capacitors. These devices may be hermetically sealed and as such do not suffer from loss of electrolyte. In addition, it is often necessary for such capacitors to perform effectively under other than ordinary temperature and humidity conditions. It is therefore desirable that the capacitor be hermetically sealed so that the penetration of moisture and other contaminants is prevented. For the most part, prior art hermetically sealed tantalum capacitors have the hermatic seals extending into the case of the capacitor. Thus, typical prior art tantalum capacitors have seals positioned at one end of the body of the capacitor with an axial electrical lead running through it. With this arrangement, the positive terminal and the glass to metal seal extend down into the capacitor case. This substantially reduces the volumetric efficiency of the capacitor. In addition, since the positive terminal extends down into the capacitor case, the leads themselves cause a loss in volumetric efficiency, and in addition tend to raise the impedance of the capacitor.

Another feature that is desirable for tantalum capacitors is that of rendering the capacitor more electrically reliable with regard to the welded connections for the electrical leads.

The present invention is concerned with the fabrication of tantalum capacitors having a novel arrangement of parts and has among its objects the provision of such a capacitor having increased volumetric efficiency.

Another object of the invention is the provision of such a capacitor wherein the capacitor is sealed by a seal that does not protrude into the capacitor case.

Another object of the invention is the provision of such a capacitor which is hermetically sealed.

Yet another object of the invention is the provision of such a capacitor which has its electrical leads external of the main body of the capacitor so as to lower its impedence.

Still another object of the invention is the provision of such a capacitor wherein the electrical terminal leads are blanked out with the anode and cathode assemblies.

Yet another object of the invention is the provision of such a capacitor wherein there is a redundancy of welded connections so as to yield a more reliable capacitor.

With the above and other objects in view, which will appear as the description proceeds, this invention resides in a novel construction combination and arrangement of parts substantially as hereinafter described and more particularly defined by the appended claims, it being understood that such changes in the precise embodiment of the invention here disclosed may be made as come with the scope of the claims.

Figure 2:
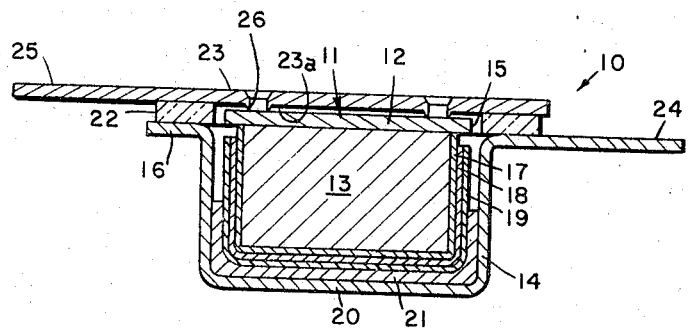

In the accompanying drawings:
FIGURE 1 is a top view of the novel capacitor; and
FIGURE 2 is a cross-section taken along line 2—2 of FIGURE 1.

Generally speaking, the objects of the invention are accomplished by providing a novel construction of a solid electrolyte tantalum capacitor which in its broadest aspect comprises a metal cup shaped container acting as a cathode, an anode assembly comprising a tantalum anode plate disposed at the open end of said cup to partially close the same, and an anodized tantalum anode pellet fabricated of pressed and sintered metallic powder and being substantially centrally connected to said plate, a semiconducting oxide making contact with said anode pellet, cathodic connecting means disposed between and making contact with said cathode cup and said anode assembly, an anode terminal plate attached to the outer surface of said tantalum anode plate and extending beyond the outer edge of said anode plate, and an electrical insulating ring attached to the rim of said cup shaped container and the inner surface of said terminal plate.

In the preferred form of the invention the tantalum terminal plate and the metal cup shaped container are "blanked out" with integral electrical leads so as to form a unitary construction with the leads extending externally from the edge of the anode plate and the rim of the cathode cup.

Referring now to the drawings, the tantalum cell or capacitor 10 in the main comprises an anode assembly 11 consisting of a top anode tantalum plate 12 connected to a tantalum anode pellet 13 made from pressed and sintered tantalum metallic powder, and cup shaped container 14. Container 14 is fabricated from a metal such as silver or brass covered with a solderable coating such that the cup acts as a cathode for the capacitor. Plate 12 is disposed at the open end of the container 14, the outer edges 15 of the plate being positioned such that the plate is more or less centered in the container's open end formed by the rim 16 to partially close the same. The pellet 13 is connected or attached to the plate 12 through resistance welding, for example.

The anode assembly is assembled prior to being installed within the cup shaped container 14. The anode plate 12 and the pressed and sintered tantalum anode 13 are first anodized to form an insulating dielectric film (not shown) on them by dipping the plate and the anode into a suitable solution such as sulfuric acid and applying a potential across the pellet and a cathodic connection, for example. Next, a semiconducting film or coating 17 acting as the electrolyte is formed on the pellet, the coating stopping just short of the anode plate 12. A suitable semiconducting material could be manganese dioxide, for example, formed by dipping the pellet in a solution of manganese nitrate and thermally converting the manganese nitrate to manganese dioxide.

Next a coating a graphite 18 is formed over the semiconducting film or coating 17 in order to lower the electrical resistance of the system. The coating is applied by dipping the anode assembly in a graphite suspension. As shown, a silver coating 19 is finally applied to form the cathode of the capacitor. This is done by dipping the anode 13 in a dispersion of silver and organic binders and solvents such as toluene, for example.

After the coatings have been applied the entire assembly is inserted in the cup shaped container 14, the assembly extending into the cup close to its base 20. The assembly is held within a silver solder 21 consisting essentially of silver, tin, and lead. This insures that a good anodic connection is made between the anode assembly and the cathode cup.

It should be understood that variations may be made in the formation of the anode and cathode assemblies without departing from the spirit of the invention.

The heart of the invention lies in the manner in which the inside of the capacitor is sealed from its outside environment. As stated previously, prior art capacitors suffered a serious loss in volumetric efficiency by having all or a major portion of the sealing means as well as the internal leads disposed within the capacitor body. In the present invention, the capacitor is sealed at its outer surface. This has been made possible by the structural arrangement of the anode assembly in conjunction with the cup cathode, which arrangement also permits full utilization of the capacitor's volume. Thus, the present capacitor is sealed and the cathode and anode electrically insulated from each other by the ring 22 so as to form the seal as part of the capacitor's outer surface or shell.

Ring 22 should be fabricated from a material that is both a good electrical insulator and an effective sealant. The ring may be fabricated from a variety of materials depending upon whether a hermetic seal is desired. In general, a ceramic such as alumina may be used if a hermetic seal is desired. For other than a hermetic seal, a thermosetting plastic such as an epoxy resin may be used. If the ceramic is used, the ring is attached to the rim 16 of the cup cathode 14 by soldering, for example. If an epoxy resin is used, the ring will be attached simultaneously to the rim 16 of the cup and inner surface 23a of the positive terminal 23 which extends beyond the outer edge 15 of the anode plate, through melting and curing of the epoxy. The ceramic ring is attached to the terminal plate through soldering. Thus, there is a seal developed outside the capacitor case between the cup shaped container 14 and terminal plate 23.

In addition to the sealing feature and the structural arrangement of the anode assembly whereby increased volumetric efficiency is obtained, the present capacitor is so constructed that there are no internal leads, thus lowering the impedance of the capacitor. To this end, cathode cup 14 is blanked out with ribbon leads 23 to form a unitary construction. Likewise terminal plate 24 is blanked out with ribbon leads 25 to form a unitary construction.

The present capacitor is also constructed such that there is a redundancy of welded connections between the anode plate 12 and the terminal plate 23. This greatly increases the reliability of the electrical connections. Thus terminal plate 23 is spot resistance welded to the anode plate 12 through the plurality of holes 26, the weld being made adjacent the holes with one electrode being inserted in the hole to the anode plate, the other electrode being in contact with the terminal plate where the weld is made. With the plates being so welded, the plates are electrically connected through parallel connections to give the desired redundancy.

From the foregoing description, taken in connection with the accompanying figures of the drawing, it will be readily apparent to those skilled in the art that this invention provides a new and improved capacitor. Accordingly, it is contemplated that the scope of the invention is to be determined from the following appended claims.

What is claimed is:

1. A solid electrolyte tantalum capacitor comprising a metal cup shaped container acting as a cathode therefor, an anode assembly comprising a tantalum anode plate disposed at the open end of said cup shaped container to partially close the same and an anodized pellet fabricated of pressed and sintered metallic powder and being substantially centrally connected to said plate, a semiconducting oxide making contact with said anode pellet, cathodic connecting means disposed between and making contact with said semiconducting oxide and said cup shaped container, an anode terminal plate attached to the outer surface of said tantalum anode plate closing the open end of said container and extending beyond the outer edge of said anode plate, and an electrical insulating ring sealingly attached to the rim of said cup shaped container and the inner surface of said terminal plate.

2. A solid electrolyte tantalum capacitor according to claim 1 in which said ring is fabricated from a ceramic.

3. A solid electrolyte tantalum capacitor according to claim 1 in which said ring is fabricated from an epoxy resin.

4. A solid electrolyte tantalum capacitor according to claim 1 in which said anode plate and said terminal plate are connected through parallel welded connections.

5. A solid electrolyte tantalum capacitor comprising a metal cup shaped container acting as a cathode, said container being blanked out with at least one ribbon electrical lead extending from the rim of said cup so as to form a unitarily constructed cathode cup shaped and electrical lead, an anode assembly comprising a tantalum plate disposed at the open end of said cup to partially close the same and an anodized tantalum anode pellet fabricated of pressed and sintered powder and being substantially centrally connected to said plate, a semiconducting oxide making contact with said anode pellet, a silver cathode disposed between and making contact with said semiconducting oxide and said cup shaped container, an anode terminal plate closing the open end of said container and attached to the outer surface of said tantalum anode plate, the body of which extends beyond the outer edge of said anode plate, said terminal plate further being blanked out with at least one ribbon electrical lead extending from the outer edge of said plate to yield a unitarily constructed terminal plate and electrical lead, and an electrical insulating ring sealingly attached to the rim of said cup shaped container and the inner surface of said terminal plate.

6. A solid electrolyte tantalum capacitor according to claim 4 in which said ring is fabricated from a ceramic.

7. A solid electrolyte tantalum capacitor according to claim 4 in which said ring is fabricated from an epoxy resin.

8. A solid electrolyte tantalum capacitor according to claim 5 in which said anode plate and said terminal plate are connected through parallel welded connections.

9. A solid electrolyte tantalum capacitor which comprises a silver cup shaped container acting as a cathode therefor, said container being blanked out with at least one ribbon electrical lead extending from the rim of said cup so as to form a unitarily constructed cathode cup and electrical lead, an anode assembly comprising a tantalum plate disposed at the open end of said cup shaped container to partially close the same, and an anodized tantalum anode pellet fabricated of pressed and sintered powder and being substantially centrally connected to said plate and extending down into said cup shaped container to an area near its bottom, a solid electrolyte comprising a thin film of manganese dioxide on said pellet anode, a graphite coating on said electrolyte, a silver cathode coating on said graphite coating, said silver cathode coating being in electrical contact with the interior surface of said cup shaped container through a silver containing solder, an anode terminal plate closing the open end of said container and attached to the outer surface of said tantalum anode plate, the body of which extends beyond the outer edge of said anode plate, said terminal plate being blanked out with at least one ribbon electrical lead extending from the outer edge of said plate to yield a unitarily constructed anode terminal plate and electrical lead, and an electrical insulating ring sealingly connected to the rim of said cup shaped container and the inner surface of said terminal plate, said terminal plate and said anode plate being connected through parallel welded connections.

References Cited

UNITED STATES PATENTS

| | | | |
|---|---|---|---|
| 2,617,863 | 11/1952 | Stinson | 317—230 |
| 2,923,866 | 2/1960 | Wagner | 317—230 |
| 3,036,249 | 5/1962 | Hall | 317—230 |

JAMES D. KALLAM, *Primary Examiner.*

U.S. Cl. X.R.

29—570